Feb. 24, 1959 R. A. ALBRIGHT 2,875,265
METAL ENCLOSED ISOLATED PHASE BUS STRUCTURE
Filed Dec. 30, 1954 2 Sheets-Sheet 2

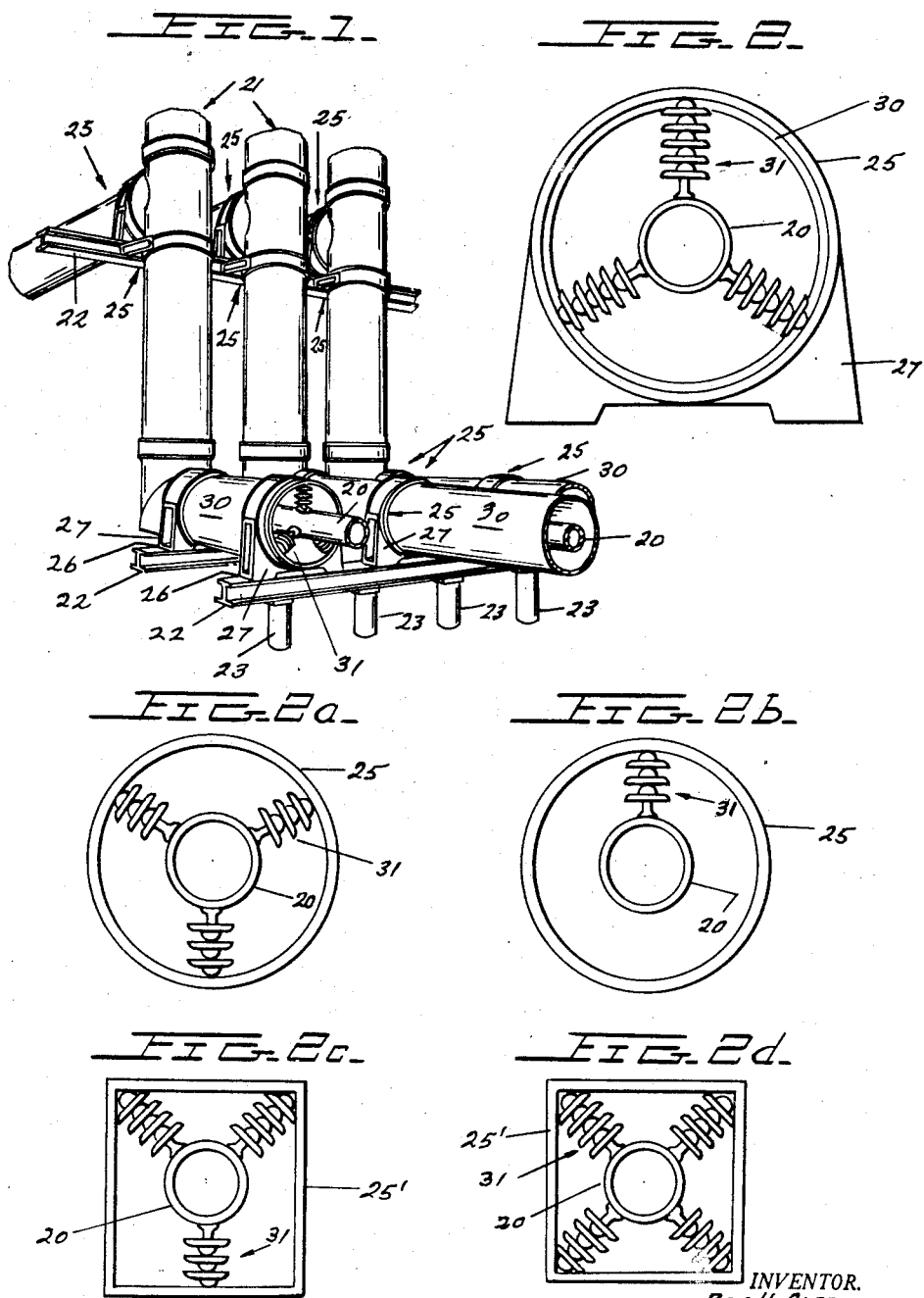

INVENTOR.
Roy H. Albright
BY
Ostrolenk & Faber
ATTORNEYS

United States Patent Office 2,875,265
Patented Feb. 24, 1959

2,875,265
METAL ENCLOSED ISOLATED PHASE BUS STRUCTURE

Roy H. Albright, Greensburg, Pa., assignor to I-T-E Circuit Breaker Company, Philadelphia, Pa., a corporation of Pennsylvania Application December 30, 1954, Serial No. 478,679

5 Claims. (Cl. 174—99)

My invention relates to metal enclosed isolated phase bus structures and more particularly is directed to a novel arrangement wherein tension or strain type insulators may be utilized to support high voltage bus structures.

In the construction of isolated phase bus structures, it is necessary to provide means to both support the bus and withstand the electromagnetic forces which are set up on the occurrence of a short-circuit. The supporting means must be a member having sufficient dielectric strength to withstand the voltage existing between the conductor and ground. Porcelain insulators have been utilized to perform this function.

Isolated phase bus structures are generally comprised of a bus or conductor, porcelain insulators, a ring or insulating support frame and an enclosure for the entire unit.

Since the porcelain insulator can withstand a greater magnitude of compression force than cantilever or tension force, the insulators are usually positioned at each ring in such a manner that they will be placed in compression rather than tension. Thus, if three or four insulators are used at each ring or frame to support the bus, the insulators will be placed in compression stresses. In like manner, if only two insulators are used, the main stress or force will be in compression although there will be some tension stress and cantilever stress.

In the prior art, various numbers and arrangements of insulators have been used to support the bus within isolated phase bus structures depending upon the weight of the conductor, the magnitude of the voltage for which the structure is designed, and the magnitude of electromagnetic forces which may be set up on the occurrence of a short-circuit. However, the prior art arrangement, wherein either a solid porcelain insulator of a hollow cylindrical porcelain insulator is used as a supporting means, has been found to be unsatisfactory for bus structures which may have to have large magnitudes of voltage such as 69 kv. or larger. That is, the extreme length of the insulator which must be used in order to provide sufficient dielectric strength usually results in a design with relatively low mechanical strength.

I have provided a novel arrangement wherein tension or strain type insulators are utilized to support a bus structure yet providing sufficient dielectric strength even if bus structures are required to handle large magnitudes of voltage such as 69 kv. or larger and which can withstand either cantilever or tension forces.

By utilizing tension or strain type insulators, a string assembly of a plurality of these units can be utilized to thereby obtain any length which may be required to obtain the dielectric strength required for the high voltage on the bus structure. With this arrangement, one end of the string assembly of suspension type insulators is attached to an adjustable bolt in the frame so that initial tension can be applied to the insulated string to prevent sag in order to give a degree of stability to the bus conductor and to axially locate the conductor within the enclosure. The other end of the string assembly of suspension insulators is attached either indirectly or directly to the conductor.

Accordingly, an object of my invention is to provide a novel metal enclosed isolated phase bus structure wherein the insulating support for the conductors can be made to withstand all of the forces to which they may be subjected by tension loadings on the insulators.

Another object of my invention is to provide an arrangement for metal enclosed isolated phase bus structures which may be required to carry large magnitudes of voltage such as 69 kv. or larger wherein no limitation is placed on the length of the insulator so that any degree of dielectric strength can be obtained.

These and other objects of my invention will be apparent from the following description when taken in connection with the drawings in which:

Figure 1 is a view in perspective of a three phase metal enclosed isolated phase bus structure of the type to which my invention is particularly adaptable.

Figure 2 is a cross-sectional view of any one frame or supporting ring of the bus structure and illustrates the manner in which a string assembly of suspension insulators may be utilized to support the conductor.

Figure 2a is a schematic view similar to Figure 2 and illustrates the manner in which a plurality of string assemblies of suspension insulators may be positioned to support a conductor in a round supporting frame or enclosure.

Figure 2b is a schematic view similar to Figure 2 illustrating the manner in which a single string assembly of suspension insulators may be utilized to support a conductor within a round supporting frame and enclosure.

Figure 2c is a schematic view similar to Figure 2 illustrating the manner in which three string assemblies of suspension insulators may be utilized to support a bus within a square supporting frame and enclosure.

Figure 2d is a schematic illustration similar to Figure 2 illustrating the manner in which four string assembly of suspension insulators may be utilized to support a bus within a square supporting frame or enclosure.

Figure 3A:
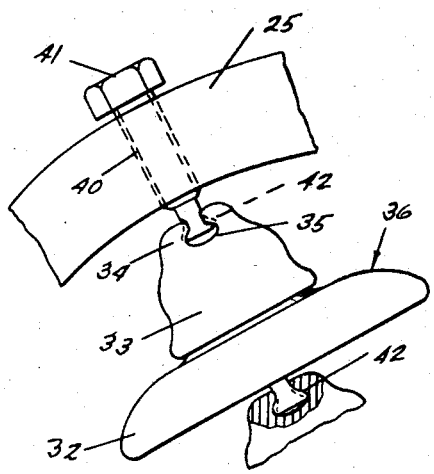
Figure 3a is a partially enlarged view illustrating the manner in which one end of a string assembly of suspension insulators is connected to a supporting frame by means of an adjustable bolt.

Referring now to Figure 1, I have here shown a three-phase bus system comprising the bus conductors 20 each supported within its own continuous housing 21, 21. The housings are supported from any suitable structural members which, in this case, are shown to be a plurality of I-beams 22, 22, which, in turn, are supported on risers 23, 23.

A metallic supporting ring 25, such as cast bronze, cast aluminum, or aluminum extrusions, is secured to the I-beam 22 in any suitable manner, preferably by bolts passing through the base 26 of the supporting leg 27 of the metallic supporting member 25 and into the flanges of the I beams 22.

The supporting rings 25 are spaced apart by distances which are determined by the length of the tubular continuous housings 30 of sheet metal material which are supported between spaced rings 25.

Accordingly, the I-beams 22 and the supporting structure for the said I-beams are likewise spaced in accordance with the predetermined dimensions of the tubular housings 30.

As will be obvious from Figure 1, the arrangement of the supporting rings 25 and the structural members which support the same are such as to permit appropriate and necessary changes in direction and taps from the bus.

Each link of a continuous tubular housing 30 is, as above pointed out, supported between a pair of opposite rings 25.

The general arrangement for the metal enclosed isolated phase bus structure above described is well known as for example as shown in Reissue Patent 23,811, and in Patent 2,293,310, both of which are assigned to the assignee of the instant invention. The supporting insulators 31 are best seen in the cross-sectional view of Figure 2. Each of the string assemblies is made up of a plurality of tension or suspension insulators of the type shown and described in Patents 2,173,292, 2,273,208 and 2,576,723.

For the purpose of illustration, I have shown the strain insulators interconnected by a ball and socket connection. However, the clevis type of strain insulator could also be used if provisions are made for swiveling between the adjustable bolts and insulator strings.

Basically, the unit is comprised of a main dielectric member 32, a metallic conducting member 33 having a socket section 34 to receive a pin similar to 35. Thus, each of the suspension type insulators 36 is provided with a socket section 34 at one end and a protruding pin 35 at its opposite end. Each member can be removably secured to its adjacent member in a string assembly 31 as illustrated in Figure 2.

As will hereinafter be described in more detail, one end of each string assembly is adjustably secured to the supporting frame 25 and the other end of the string assembly is attached to the conductor 20. In the event the conductors such as 20 of the isolated phase bus structure are installed in a high voltage installation such as 69 kv. or greater, a larger number of suspension insulators 36 can be placed in a string assembly 31 in order to provide the required dielectric strength for the system.

If the bus structure is designed for low voltage application, then the string assembly 31 need only comprise a small number of suspension insulators 36. However, it will be apparent that the arrangement is particularly adaptable for high voltage installations since the length of the string assembly can be made much larger than has heretofore been possible even with a single insulator.

Furthermore, in the prior art arrangement, the single insulator, although capable of withstanding extreme compression stresses, is not capable of withstanding cantilever or tension stresses. However, the string assembly of suspension insulators can withstand much larger magnitudes of tension stresses and due to its flexibility will not be subjected to cantilever stresses.

In the illustration of Figure 2, I have shown three series of string assembly suspension insulators at each circular supporting frame. However, it will be apparent to those skilled in the art that any number of string assemblies of suspension insulators can be used and also, the arrangement can be applied to either a circular or square supporting ring and housing arrangement.

Thus, as illustrated in Figure 2a, I have shown four string assemblies for supporting the conductor 20 within a circular supporting frame. Figure 2b illustrates one arrangement in which a single string assembly of suspension insulators may be utilized to support a conductor. Figures 2c and 2d illustrate a three and four string assembly of suspension insulators, respectively, for a square supporting frame or enclosure.

As heretofore noted, the outwardly projecting end of each string assembly 31 of suspension insulators 36 can be adjustably secured to the frame member 25. Thus, as illustrated in the enlarged partial view of Figure 3a, I have shown one manner in which this can be accomplished. The ring 25 is provided with a threaded portion 40 which extends radially through the ring. A threaded adjusting bolt 41 is in threaded engagement with the opening 40 of the supporting ring 25. The end of the bolt extending radially inward contains a ball 42 which is positioned within the socket 34 of the tension or suspension insulator 36. By rotating the bolt 41, the arrangement can be properly adjusted to axially locate the conductor 20 within the enclosure 30 and supporting frame 25 to apply the proper initial tension to the string assembly 31 to prevent sag and give the proper degree of stability to the bus conductor 20.

Figure 3B:
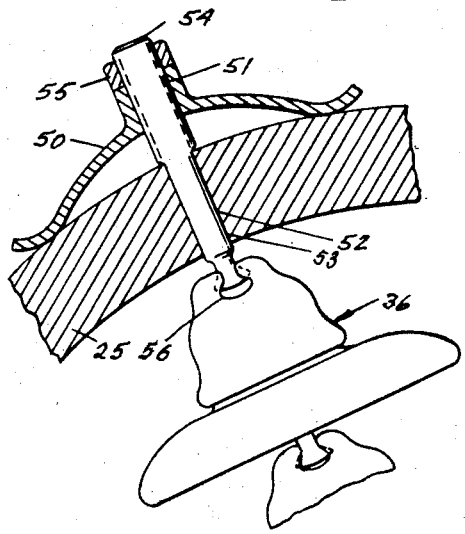
Figure 3b is a partially enlarged view similar to Figure 3a and illustrates a modification whereby a biasing leaf spring may be utilized at the supporting frame in order to reduce the shock on impact developed by electromagnetic forces.

In Figure 3b, I have illustrated another embodiment of the manner in which the end of the string assembly 31 which extends radially outward can be connected to the ring assembly. In this arrangement, a biasing means is used in order to reduce the shock and impact on the ring assembly 31 which may be developed by the electromagnetic forces.

In this arrangement, a curved leaf spring 50, having an opening 51 is positioned on the external surface of the supporting ring 25. A bolt 52 extends through an appropriate radial opening 53 in the supporting frame 25. The end of the bolt 52 which extends radially outward is provided with a threaded end 54 which passes through the opening 51 in the curved leaf spring 50. A nut 55 is threadably engaged with the end 51 of the bolt 52. The end of the bolt 52 which extends radially inward is provided with a ball section 56 which is positioned within the socket 34 of the tension insulator 36.

The initial adjustment for positioning the conductor 20 and applying the initial tension on the insulator string 31 is provided by the rotating of nut 55. The spring 50 maintains a fixed pressure on the string assembly 31 of suspension insulators 36. In the event the assembly is subjected to shock force due to the electromagnetic forces set up by short-circuit current, the entire string assembly 31 would be moved inwardly against the bias of the curved leaf spring 50. However, after the initial shock or impact is past, the biasing pins of the leaf spring 50 would return the entire assembly to its initial position.

Figure 4A:
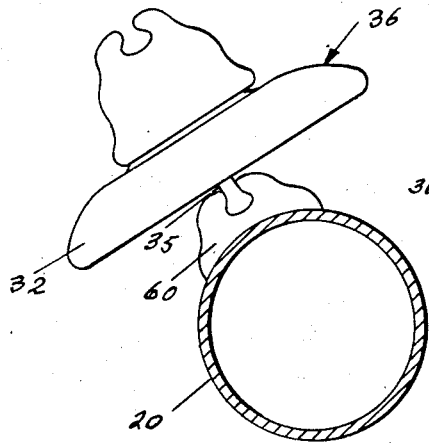
Figure 4a is a partially enlarged view of the other end of a string assembly of suspension insulators showing the manner in which the unit can be connected to the conductor. In this illustration a lug is welded or brazed to the conductor and the pin of the suspension insulator is connected thereto.
Figure 4B:
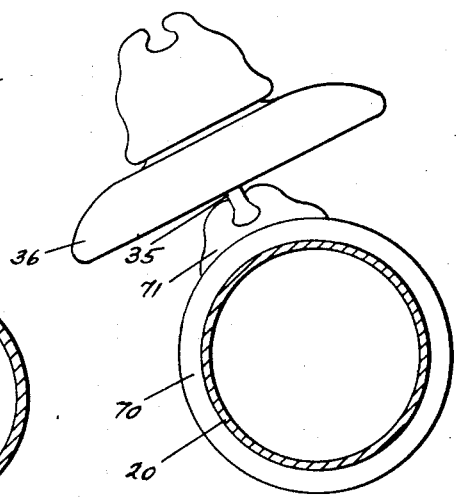
Figure 4b is an enlarged sectional view similar to Figure 4a and illustrates another arrangement whereby the other end of the string assembly of suspension insulators may be attached to the conductor. In this arrangement, a sleeve casting is placed over the conductor and the pin of the suspension insulator is positioned within a curve thereof.

The end of the string assembly 31 which extends radially inward can be either directly or indirectly connected to the conductor 20 as illustrated respectively in Figures 4a and 4b. Thus, as illustrated in Figure 4a, the conductor 20 is provided with a lug 60 which may be secured thereto as for example by a welding or brazing process. The lug 60 is provided with a socket to receive the ball pin 35 of the suspension insulator 36. Thus, the end of the string assembly 31 is secured to the conductor 20 in substantially the same manner that each of the insulators are secured to each other.

In Figure 4b, I have illustrated another embodiment of the manner in which the string assembly 31 can be connected to the conductor. In this arrangement, there is an indirect connection to the conductor. That is, a sleeve 70 is positioned concentric with respect to the conductor 20 and is provided with a protruding section 71 containing a socket to receive the ball pin 35 of the last tension insulator 36 of the string assembly 31. Thus, the string assembly 31 is connected to the sleeve casting 70 by means of a ball and socket connection in substantially the same manner that each of the tension or suspension insulators 36 are connected to each other.

In the illustration of the figures, I have shown my invention in connection with the preferred arrangement for isolated phase bus structures. However, it will be apparent that my invention can also be applied to non-segregated bus structures and also can be applied to the type of bus structure wherein the insulating supporting means for the conductor are connected directly to the base of the bus structure rather than through the supporting ring of the bus structure. That is, although my invention is particularly adaptable to high voltage applications wherein the single insulator design would be impractical since it has very little cantilever strength, it can also be used in low voltage applications.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A bus structure comprising a bus conductor, a supporting frame and means for supporting said bus conductor; said means positioned between said bus conductor and said supporting frame and being in tension stress; said means being comprised of a plurality of suspension type insulators; one end of said plurality of suspensions type insulators connected to said supporting frame by means of an adjusting bolt; said one end connected to said adjusting bolt by a ball and socket connection; the other end of said plurality of suspension insulators directly connected to said bus conductor by a ball and socket connection; said means comprising at least three strings of said suspension type insulators; and said strings of said suspension type insulators providing support for the weight of said bus conductor and the forces on said bus conductor as a result of electro-magnetic forces.

2. A bus structure comprising a bus conductor, a supporting frame and means for supporting said bus conductor; said means positioned between said bus conductor and said supporting frame and being in tension stress; said means being comprised of a plurality of suspension type insulators; one end of said plurality of suspension type insulators connected to said supporting frame by means of an adjusting bolt; a swivel connection between said one end and said adjusting bolt; biasing means; said biasing means operatively positioned to exert a tensional force on said plurality of suspension insulators; said means comprising at least three strings of said suspension type insulators; and said strings of said suspension type insulators providing support for the weight of said bus conductor and the forces on said bus conductor as a result of electro-magnetic forces.

3. A bus structure comprising a bus conductor, a supporting frame and means for supporting said bus conductor; said means positioned between said bus conductor and said supporting frame and being in tension stress; said means being comprised of a plurality of suspension type insulators interconnected by a ball and socket connection; one end of said plurality of suspension type insulators connected to said supporting frame by means of an adjusting bolt; the other end of said plurality of suspension insulators indirectly connected to said conductor by a ball and socket connection to a sleeve positioned concentric to said conductor; said means comprising at least three strings of said suspension type insulators; and said strings of said suspension type insulators providing support for the weight of said bus conductor and the forces on said bus conductor as a result of electro-magnetic forces.

4. In a bus structure having a bus conductor, insulators, a supporting frame and a housing; said insulators being comprised of a string assembly of tension insulators in tension stress interconnected by ball and socket connection; one end of said string assembly of tension insulators adjustably connected to said supporting frame by a ball and socket arrangement; the other end of said string assembly of tension insulators connected to said conductor by a ball and socket arrangement; said housing enclosing said bus conductor and string assembly of suspension insulators; said bus structure having at least three of said string assemblies extending radially from said bus conductor.

5. A bus structure comprising an enclosure, a bus conductor and means to support said bus conductor; said means being comprised of at least three string assemblies of suspension insulators in tension stress interconnected by a ball and socket arrangement; each of said string assemblies extending radially from said bus conductor to said enclosure; one end of each of said string assemblies adjustably connected to said enclosure; the other end of each of said string assemblies connected to said bus conductor.

References Cited in the file of this patent

UNITED STATES PATENTS

| | | |
|---|---|---|
| 1,149,096 | Somerville | Aug. 3, 1915 |
| 1,160,544 | Steinberger | Nov. 16, 1915 |
| 1,616,931 | Thomas | Feb. 8, 1927 |
| 1,691,330 | Austin | Nov. 13, 1928 |
| 2,313,972 | Rugg | Mar. 16, 1943 |

UNITED STATES PATENT OFFICE

CERTIFICATE OF CORRECTION

Patent No. 2,875,265  February 24, 1959

Roy H. Albright

It is hereby certified that error appears in the above numbered patent requiring correction and that the said Letters Patent should read as corrected below.

In the drawings, Sheets 1 and 2, line 2, for "R. A. ALBRIGHT", in each occurrence, read -- R. H. ALBRIGHT --.

Signed and sealed this 4th day of August 1959.

(SEAL)
Attest:

KARL H. AXLINE
Attesting Officer

ROBERT C. WATSON
Commissioner of Patents